United States Patent Office 2,882,525
Patented Apr. 14, 1959

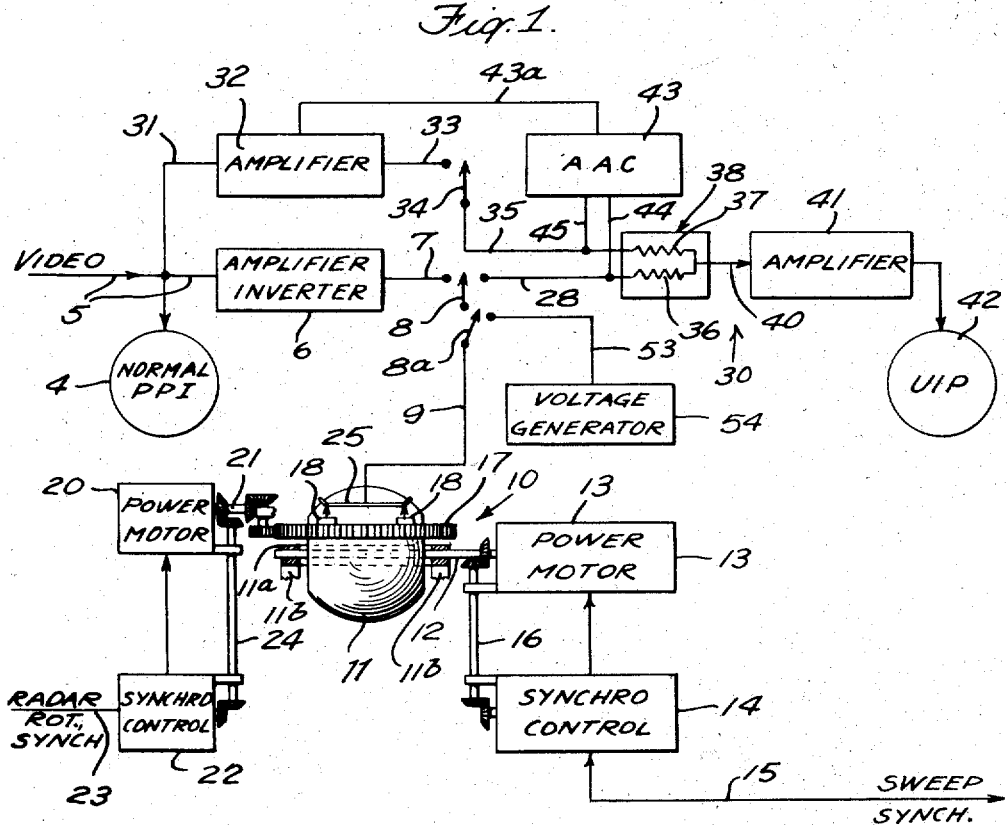
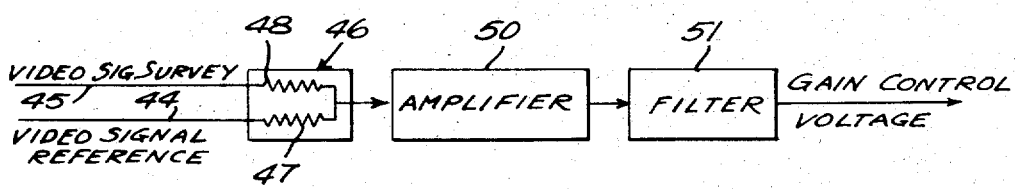

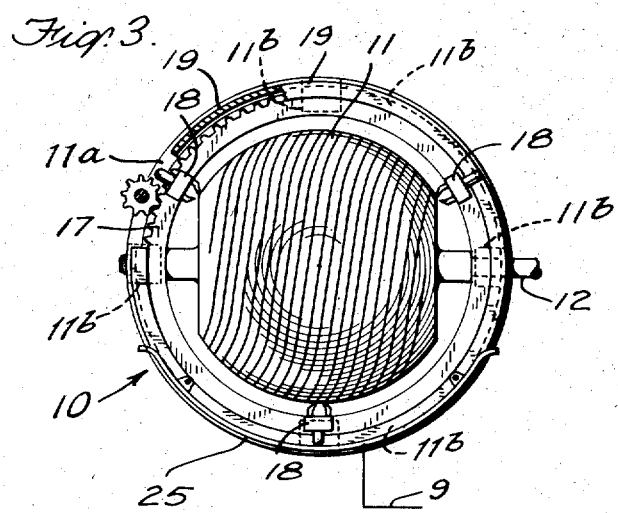
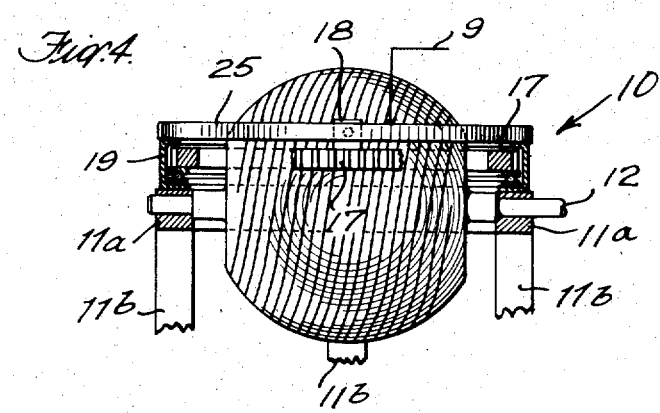
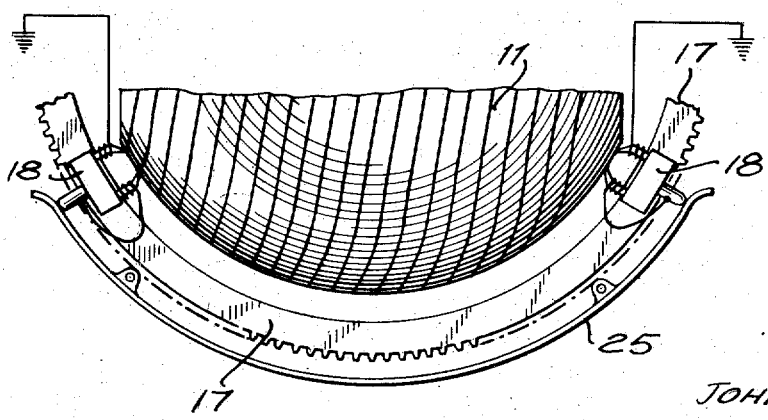

2,882,525

UNUSUAL INDICATOR PRESENTATION SYSTEM

John Young, Jr., Corona, N.Y., assignor to Sperry Rand Corporation, Ford Instrument Company Division, Long Island City, N.Y., a corporation of Delaware Application September 22, 1955, Serial No. 535,914

6 Claims. (Cl. 343—5)

This invention relates to an apparatus which is adapted for attachment to conventional radar equipment having a primary purpose to control the presentation of the video signal so as to eliminate therefrom those pulses which are common to it and some previously generated signal.

In general, the invention provides means for indicating changes or additions in a scene that is represented by a standard radar signal which is recorded and thereafter employed as a reference for comparison with subsequent radar presentations. It might, for example, be desired to compare changes occurring in a highly concentrated industrial area which is so congested with buildings and factories that the addition of other edifices could easily go unnoticed on reexamination. This invention contemplates the provision of means for obliterating that which is common to the reference and subsequent surveys and for reporting on a radar scope those objects that have come into being in the area between surveys.

The invention accomplishes these ends by providing a magnetic recorder which serves as a memory for the reference survey and is capable of playing back the recorded presentation at such time as it is desired to compare it with a newer one. The new and reference surveys are represented by positive and negative pulses, respectively, and means are provided for combining the two waves and subjecting them to phase and amplitude control so that the unopposed pulses may pass to a scope which is especially provided to present the unusual indications.

The recorder includes a specially designed spherical member which is mounted to rotate in synchronism with the radar sweep and associated recording and pick-off units which traverse continuously and unidirectionally across the magnetic surface of the spherical member in synchronism with the rotation of the radar. The diameter of the member is determined in accordance with the angular rate of radar scan and the maximum pick-off speed of the recorder.

The nature of the invention will be explained in more detail in the following description which should be read in conjunction with the accompanying drawings, in which Fig. 1 is a general schematic of the invented system;

Fig. 2 illustrates schematically an automatic amplification control unit;

Fig. 3 is a plan of the recording unit;

Fig. 4 is an elevation of the same; and

Fig. 5 is an enlarged fragmental portion of Fig. 3 showing the pick-offs.

As shown in Fig. 1, a conventional radar scope 4 of the P.P.I. (plan position indicator) type is adapted to receive on line 5 a standard video signal which is visually indicated on the scope. Line 5 is connected to the input side of inverting amplifier 6 which in turn is connected by means of output lead 7, switch 8, switch 8ª and lead 9 to recorder 10.

The recorder 10 comprises an aluminum ball 11 mounted in an annular member 11ª supported by legs 11ᵇ to rotate on a horizontal shaft 12 which is in gear connection with a power motor 13 and is driven in synchronism with the radar sweep. To this end a synchronous control unit 14 is energized by the sweep signal on lead 15 and is operatively connected to a power motor 13 whose output is fed back to the unit 14 by feed back shaft 16. The rotation of the ball 11 is thereby synchronized with the P.P.I. sweep.

A ring gear 17 is rotatably mounted on bearings within annular channel member 19 (Figs. 3 and 4) near the ball axis and is adapted to be driven in synchronism with the rotation of the radar. To this end a power motor 20 having shaft and gear connection 21 with the ring gear is energized by a synchronous control unit 22 which is controlled by the drive for the radar antenna rotation, the input connection 23 for the unit 22 being driven in accordance therewith. A feed back shaft 24 is connected from the output of motor 20 to the unit 22 as in the case of the drive for the ball 11. The ring gear 17 carries three magnetic pick-offs 18, the magnetic cores of which are supported in close adjacency to the surface of the ball 11 and the soft iron magnetized particles distributed thereon. The magnetic pick-offs are spaced 120 degrees apart on the ring gear and are energized by means of a fixed contact 25 which is mounted on channel member 19, being electrically connected to lead 9 and in brush contact with the pick-offs. The contact is arcuately formed and extends 120 degrees about the ball exteriorly of the ring gear 17. Actually the ring gear is driven in a one to three ratio with the radar so that for each 120 degrees of its rotation a different pick-off is employed to convey a video signal representing 360 degrees of radar scan. The recording is thus achieved continuously and unidirectionally.

The lead 9 is also connectable to lead 28 through the switch 8. The lead 28 is employed to convey the recorded video signal to the unusual indication presentation section 30 of the computer. The lead 5 is also connected to lead 31, amplifier 32, lead 33, switch 34 and lead 35 and is therefore adapted to convey to the section 30 video signals representing subsequent radar surveys. The leads 28 and 35 are connected to the legs 36 and 37, respectively, of comparison network box 38 where the subtractions of corresponding pips in the reference and survey signals are effected. The output lead 40 for the network box 38 carries information appearing in the positive survey signal which was not opposed by any corresponding negative pulses from the recorder 10 and was therefore permitted to pass to the output as an error sginal. The lead 40 is connected to amplifier 41 which in turn is connected to unusual indication presentation scope 42 which registers by displaying white pips on its dial the positive video pulses passed by the comparison network 38.

The reference and survey signals are subjected to amplification control by means of the automatic amplification control unit 43 which is connected to leads 28 and 35 by leads 44 and 45, respectively. The output of the unit 43 is fed to the amplifier 32 by lead 43ª. As shown in Fig. 2, the unit 43 includes in series connection a second comparison network 46 whose legs 47 and 48 are connected to the leads 44 and 45, respectively, an amplifier 50 and a filter 51 which introduces a time delay in the gain control voltage which is transmitted to the unusual indication presentation section 30 to substantially eliminate undesired pulses without affecting the desired ones that represent unusual data. The time constant may be for ten radar rotations. The substantial elimination of the undesired pulses in the two video signals in the amplitude control unit 43 is due to the fact that most signal pulses are of fairly constant amplitude over relatively long time intervals so that by introducing a delay factor to both signals the effect of slightly differing atmospheric and radar conditions prevailing during their generation is practically eliminated.

The second switch $8^a$ is provided in lead 9 to connect the recorder 10 with a lead 53 and voltage generator 54 which is employed to wipe out or erase the recorded reference signal so that a new signal maybe recorded for the purpose of subsequent comparison.

In operation switches 8 and $8^a$ are thrown to the left to record the reference signal and when it is desired at some later time to compare this signal with a survey signal, the switch 34 is closed and switch 8 is thrown to the right. The scope 42 should then register just the pips representing the added objects in the scanning field. The radar should be well balanced statically with respect to wind or the power motors should be capable of rapid fluctuation rates with little error so that the phase of the two signals will be properly controlled to permit their ready comparison.

The diameter of the ball 11 must also be carefully determined for the desired synchronization and recycling signal. In general, the ball must be driven so as to give one rotation of the ball per rotation of the radar as in linear recording or one rotation of the ball in the time of one sweep as in magnetic recording.

In order to calculate the diameter of the ball in linear recording it is assumed that maximum pick-off speed is about 1,600 inches per second with a maximum of 80 digits per inch. The magnetic channels are a minimum of one-eighth of an inch apart and the radar has a six second rotation.

The average length of the channels over 120 degrees of the surface of the ball of a diameter D inches is $\pi D \sin 30°$ or $\frac{1}{2}\pi D$. There being eight channels per inch the number of channels in 120 degrees would be $$\frac{\pi D}{3} \times \frac{1}{1/8}$$

Therefore the approximate linear length of the channels over the entire 120 degrees of the ball's surface is equal to (1) $$\frac{\pi D}{3 \times 1/8} \times \frac{\pi D}{2} \text{ or } \frac{4}{3}\pi^2 D^2$$

For six seconds of rotation the maximum linear distance for the assumed pick-off speed would be 9600 inches. Substituting in Equation 1 the diameter of the ball should be 26.9 inches in order to satisfy the given conditions for a linear recorder.

For an area recording system with the channels spaced, for example, .05 inch apart instead of .125 inch, $D_1$ is equal to $$\frac{\Delta}{\Delta_1} \cdot D$$

when $D_1$ is the diameter of the ball, $\Delta$ is the spacing of the channels for linear recording and $\Delta_1$ is the spacing for area recording. Therefore $D_1$ would be $$\frac{.05}{.125} \times 26.9$$

or 10.74 inches for a maximum pick-off speed of 1,600 inches per second.

In either linear or area recording the diameter of the ball may be reduced by using more than one ball, the diameter of each ball varying inversely to the number of balls employed. As demonstrated above, smaller balls may be used in magnetic area recording which also has the advantage of eliminating the need for synchronizing the sweep and the angular position of the radar.

Other alterations and modifications in the individual units may be effected by one skilled in the art without departing from the principle of the novel combination defined in the appended claims, in which—

What is claimed is:

1. A system for presenting unusual radar indications comprising means for receiving standard radar video signals, said means including an amplifier inverter and a recorder, said recorder comprising a rotatable member having a magnetized surface, a ring carrying pick-offs mounted to rotate about said surface and a fixed contact engaging said pick-offs and connectable to said amplifier inverter, means adapted to be connected to a radar sweep circuit for rotating said member in synchronism therewith and means adapted to rotate said ring in synchronism with the rotation of the antenna of said radar, a comparison network connectable directly to the output of the video signal receiving means and to said fixed contact whereby the recorded video signal may be subtracted from the signal received directly from said radar, an amplifier connected to the error signal output of said comparison network and an unusual indication presentation scope connected to said amplifier, said scope being adapted to visually present said error signal.

2. A system for presenting unusual radar indications as claimed in claim 1 wherein the magnetized surface of said rotatable member is spherical and said pick-offs are spaced 120 degrees apart on the ring to permit continuous and unidirectional recording and play back.

3. A system for presenting unusual radar indications as claimed in claim 2 wherein a voltage source is connectable to said recorder whereby any recorded video signal may be erased.

4. A system for presenting unusual radar indications as claimed in claim 1 wherein said means for receiving standard video signals includes a second amplifier directly connectable to said comparison network and an automatic amplitude control unit whose input side is connectable to the said second amplifier and said recorder and whose output side is connected back to said second amplifier, whereby the amplitude of the signals from said recorder and the radar may be adjusted substantially to eliminate errors due to differing radar conditions when the former and the latter signals were generated.

5. A system for presenting unusual radar indications as claimed in claim 4 wherein said automatic amplitude control unit comprises in series a second comparison network, an amplifier and a filter whereby there is introduced into the output of said second amplifier a time delay during which signal pulses will be fairly constant due to the substantial elimination by averaging out of undesired pulses.

6. A system for presenting unusual radar indications as claimed in claim 5 wherein the magnetized surface of said rotatable member is spherical and said pick-offs are spaced 120 degrees apart to permit continuous and unidirectional recording and play back.

References Cited in the file of this patent

UNITED STATES PATENTS

| | | |
|---|---|---|
| 2,410,424 | Brown | Nov. 5, 1946 |
| 2,422,135 | Sanders | June 10, 1947 |
| 2,566,189 | Gloess | Aug. 28, 1951 |
| 2,702,382 | Mesner | Feb. 15, 1955 |